US 6,601,482 B2

(12) United States Patent
Hughes et al.

(10) Patent No.: US 6,601,482 B2
(45) Date of Patent: Aug. 5, 2003

(54) RECESSED HEAD FASTENER AND DRIVER SYSTEMS

(75) Inventors: Barry J. Hughes, Gloucester, MA (US); Michael L. Mowins, Gloucester, MA (US)

(73) Assignee: Phillips Screw Company, Wakefield, MA (US)

( * ) Notice: Subject to any disclaimer, the term of this patent is extended or adjusted under 35 U.S.C. 154(b) by 0 days.

(21) Appl. No.: 09/844,996

(22) Filed: Apr. 27, 2001

(65) Prior Publication Data
US 2002/0029665 A1 Mar. 14, 2002

Related U.S. Application Data

(63) Continuation of application No. 08/943,341, filed on Oct. 3, 1997, now Pat. No. 6,223,634.

(51) Int. Cl.7 ................................................ B25B 15/00
(52) U.S. Cl. ........................................ 81/460; 411/404
(58) Field of Search .......................... 81/460, 441, 461, 81/436; 411/403, 404, 409, 919

(56) References Cited

U.S. PATENT DOCUMENTS

| 1,899,489 | A | 2/1933 | Wickbergh |
| 2,474,994 | A | 7/1949 | Tomalis |
| RE24,878 | E | 9/1960 | Smith et al. |
| 3,108,623 | A | 10/1963 | Muenchinger |
| 3,282,145 | A | 11/1966 | Prescott |
| 3,763,725 | A | 10/1973 | Reiland |
| 3,888,144 | A | 6/1975 | Parsons |
| 3,894,450 | A | 7/1975 | Hill et al. |
| 3,897,812 | A | 8/1975 | Arnn |
| 3,913,647 | A | 10/1975 | Arnn |
| 3,945,071 | A | 3/1976 | Flodin |
| 3,985,170 | A | 10/1976 | Iskra |
| 4,010,670 | A | 3/1977 | Lejdegard |
| 4,033,003 | A | 7/1977 | Marroquin |
| 4,033,244 | A | 7/1977 | Jacobson |

(List continued on next page.)

FOREIGN PATENT DOCUMENTS

| DE | 25 38 139 | 3/1976 |
| FR | 2 442 370 | 11/1978 |
| GB | 1526225 | 9/1978 |
| LU | 41783 | 3/1962 |

OTHER PUBLICATIONS

"Ribbed Recess Fasteners", *Machine Design*, vol. 52, No. 4, Feb. 22, 1990, p. 130.

*Primary Examiner*—D. S. Meislin
(74) *Attorney, Agent, or Firm*—Kirkpatrick & Lockhart LLP

(57) ABSTRACT

Recessed head fasteners are provided with a configuration by which the force applied by the blades of the driver to the recessed wings is applied at the radially outer regions of the wings. The wings of the fastener recess may be provided with torque pads at the outer regions of the wings adapted to engage the outer portions of the driver blades. The torque pads may be defined by relieved regions on the drive walls of the recess wings. The relieved regions are formed to avoid contact with the driver blades. Stabilizing ribs also may be defined at the radially inward regions of the drive walls. A recess engageable driver may include a plurality of radially extending ribs configured to promote engagement of the ribs with the most radially outward regions of the recess drive walls. The driver and the recess are compatible with each other as well as with otherwise corresponding conventional recesses and drivers that do not incorporate the invention. Also disclosed are punches and methods for making the disclosed fasteners.

20 Claims, 7 Drawing Sheets

U.S. PATENT DOCUMENTS

| | | |
|---|---|---|
| 4,037,514 A | 7/1977 | Lliteras |
| 4,084,478 A | 4/1978 | Simmons |
| 4,109,691 A | 8/1978 | Wilson |
| 4,140,161 A | 2/1979 | Russo et al. |
| 4,146,073 A | 3/1979 | Lliteras |
| 4,149,434 A | 4/1979 | Wilson |
| 4,151,621 A | 5/1979 | Simmons |
| 4,187,892 A | 2/1980 | Simmons |
| 4,242,932 A | 1/1981 | Barmore |
| 4,269,246 A | 5/1981 | Larson et al. |
| 4,288,902 A | 9/1981 | Franz |
| 4,311,071 A | 1/1982 | Bassell |
| 4,314,489 A | 2/1982 | Arcangeli |
| 4,361,412 A | 11/1982 | Stolarczyk |
| 4,384,812 A | 5/1983 | Miyagawa |
| 4,430,035 A | 2/1984 | Rodseth |
| 4,434,688 A | 3/1984 | Bowles |
| 4,528,874 A | 7/1985 | Dunn |
| 4,590,825 A | 5/1986 | Vaughn |
| 4,800,788 A | 1/1989 | Goldstein |
| 4,970,922 A | 11/1990 | Krivec |
| 4,979,354 A | 12/1990 | Johnson et al. |
| 4,998,454 A | 3/1991 | Chaconas et al. |
| 5,101,698 A | 4/1992 | Paradiso |
| 5,120,173 A | 6/1992 | Grady |
| 5,203,742 A | 4/1993 | Grady |
| 5,237,893 A | 8/1993 | Ryder |
| 5,277,531 A | 1/1994 | Krivec |
| 5,284,075 A | 2/1994 | Strauch et al. |
| 5,302,068 A | 4/1994 | Janusz et al. |
| 5,364,212 A | 11/1994 | Gill |
| 5,378,101 A | 1/1995 | Olson et al. |
| 3,237,506 A | 3/1996 | Muenchinger |
| 5,509,334 A | 4/1996 | Shinjo |
| 5,528,966 A | 6/1996 | Coppejans |

# RECESSED HEAD FASTENER AND DRIVER SYSTEMS

RELATED APPLICATION

This application is a continuation of application Ser. No. 08/943,341 filed Oct. 3, 1997, now U.S. Pat. No. 6,223,634.

FIELD OF THE INVENTION

This invention relates to rotatably drivable threaded fasteners and drivers therefor as well as devices and methods for their manufacture.

BACKGROUND OF THE INVENTION

Use of powered tools to drive threaded fasteners at high speed and high torque loads results in high forces applied by the driver to the fastener. Although many threaded fastener drive systems, particularly those with a driver-engageable recess in the fastener head, are designed to have surfaces that are engaged by corresponding surfaces on the driver, such ideal surface-to-surface engagement, at best, is difficult to achieve in practice. Rather than surface-to-surface engagement between the driver and fastener, by which the driving load can be distributed over a broad surface area, driver-recess engagement often is concentrated in small areas or points. That may result from a number of factors such as inconsistencies in the manufacture of the fastener or the driver, as well as difficulties encountered in the field. Field-encountered difficulties may include, for example, misalignment of the driver and fastener or inability to fully seat the driver in the recess because of paint or other debris that may have collected in the recess. Even slight misalignment between the driver and the fastener, or a variation of the fastener or driver from design specifications, can result in substantial reduction in the area of contact between the driver and fastener, in many cases resulting in near point-like contact of several portions of the driver and fastener. Application of high torque under such circumstances necessarily results in concentrated stresses in the materials of the driver and the recess that, in turn, can lead to failure of the material, either by plastic deformation or fracture. Even slight plastic deformation of the engagement surfaces of the recess and driver can adversely affect system performance. If the recess deforms to define ramp-like surfaces inclined from the vertical, the driver may "cam-out" of the recess under the influence of the applied load. Such cam-out is undesirable, not only because it results in premature or uncontrollable disengagement of the driver and recess, but also because the suddenly disengaged driver can slip onto and damage the work piece. Additionally, excessive stress in the driver blade while driving the fastener can cause the blade to deform in a manner that reduces the surface area contact with the fastener and effectively shifts the region of contact radially inwardly, thereby reducing the effectiveness of driver-recess engagement and increasing the risk of failure. Even when the sidewalls of the driver and recess wings engage in broad surface-to-surface contact, the point at which the resultant force applied by the driver to the recess sidewall typically is at a center of effort located generally at the center region of the sidewall. Consequently, the resultant force is applied at a location that is substantially radially inwardly from the outermost extremity of the sidewall. The foregoing difficulties may be encountered whether the fastener is being driven in an installation or a removal direction. In many applications, the ability to remove the fastener quickly and effectively is at least, if not more, critical than its installation.

A number of recess and driver engagement systems have been developed to enhance the efficiency of the drive system, to reduce the risk of cam-out as well as to improve other aspects of the drive system. One such system that has had use in aircraft applications is described in U.S. Pat. No. Re.24,878 (Smith et al.). The recesses are defined by three or four wings that extend radially from the central portion of the recess. Each wing defines an installation wall and a removal wall, both of which are designed to be substantially vertical, that is, to lie in a plane that parallels the central axis of the fastener. The driver has a complementary configuration. The system is intended to promote axial alignment of the driver and fastener by eliminating the tendency for the driver to "rock" in the recess as well as to resist cam-out. Axial alignment of and full seating of the driver within the recess is essential to obtain the benefit of the vertically oriented driving and removal walls. Even with this system, application of high torque loads may cause some deformation of the wings of the driver in a manner that tends to reduce the area of the region of contact between the driver blades and the walls of the recess wings as well as to shift the contact region radially inwardly. That, in turn, increases the risk of plastic distortion of the recess that can lead to progressive deterioration of the driver-recess engagement with resulting adverse consequences.

Another driver-recess engagement system is described in U.S. Pat. No. 3,237,506 (Muenchinger) that has been incorporated in fasteners commercially developed for commercial application under the trade designation Pozidriv®. Among the characteristics of the Pozidriv® system is that the sidewalls of each of the wings of the recess is designed to lie in a plane that is substantially vertical. In forming such substantially vertical sidewalls by the conventional cold header technique in which a two-blow heading machine impacts the end of the wire or other material from which the fastener is made, while the wire is supported in a die of the heading machine, first with a punch that forms a bloom (a partially formed head) on the end of the fastener blank and then with a finishing punch that finishes the head and forms the driver-engageable recess. The operation is carried out automatically and at high speed. The punches are impacted against and withdrawn from the head end of the fastener blank along the longitudinal axis of the fastener blank. Among the constraints inherent in the heading process is that the recess design should be free of undercut regions, that is, regions that, although being formable as the punch is impacted into the fastener head, would be obliterated when the punch is retracted. The Muenchinger patent describes a recess and punch configuration intended to reduce or eliminate the effect of "metal fall-away" that tends to occur when punching a recess in a fastener head. The result of the phenomenon of metal fall-away is that the recess does not conform precisely to the configuration of the recess-forming punch. The lack of accurate conformance results in a recess that will exhibit increased cam-out and will reduce driver stability, resulting in a loose, wobbly fit between the driver and the recess. Those difficulties result in a reduced torque capacity of the mated fastener and driver.

U.S. Pat. Nos. 4,187,892 (Simmons) and 5,120,173 (Grady) describe a drive system for threaded fasteners in which intentionally deformable ribs are provided on two or more of the driver-engageable sidewalls of one or both of the recess and driver. The ribs project slightly from the sidewalls and are designed to deform or cause deformation of the ribs they engage in a manner that provides an interlocking engagement. The interlocking engagement of the ribs resists cam-out. Such anti-cam-out ribs may be incorporated in recesses having substantially vertical drive walls as well as those recesses in which the sidewalls are inclined substantially from the vertical. The ribs are formed during the cold heading process in which the recessed fastener head is formed in a two-blow heading machine.

Although the inclusion of anti-cam-out ribs on the recessed head fasteners significantly improves the drive performance of the fasteners, some types of recessed head fasteners may require compromises in the design in order to include the advantages of the anti-cam-out ribs. The anti-cam-out ribs cannot be formed in a manner that would leave an undercut that would result in the rib being torn out as the recess forming punch is retracted. In recesses with substantially vertical sidewalls the anti-cam-out rib also must be essentially vertical and parallel to the fastener axis. Although it would be desirable to locate such ribs at a maximum radial distance from the central axis of the fastener, that is, at the more radially outward regions of the recess sidewalls, the height of the recess sidewalls progressively decrease in height toward their radial extremities. Consequently, the vertical height of the rib necessarily is very short toward the radial extremities. Such a rib can only be engaged by a ribbed driver blade near the upper end of the recess adjacent the top surface of the fastener head. A short rib, so located, presents greater risk of improper engagement or non-engagement by the ribbed driver. Consequently, an anti-cam-out rib, particularly in a recess having vertical or near vertical drive walls, typically has been located more radially inwardly along the sidewall.

Also among the compromises to be considered when employing a ribbed recess is that the protrusion of the rib into the envelope of the recess wing necessarily requires either that the width of the wing be increased or that the width of the mating driver blade be reduced to accommodate that projection. That, in turn, requires a reduction in the mass of material of the fastener head, or the driver blades, or both, in order that the driver blade can be properly inserted into the recess. This design compromise may be particularly pronounced in those applications where it is desirable to provide an anti-cam-out rib on both the installation and the removal sidewalls of the recess wings. Additional complications result from the desirability that such recesses should be compatible with existing drivers. In many cases, the inclusion of anti-cam-out ribs in the recess may restrict the extent to which an existing driver can penetrate into the recess, possibly preventing full depth penetration, consequently reducing the effectiveness of torque transmission.

The anti-cam-out ribs that have been incorporated into recessed head fastener systems typically have had a V-shaped cross-sectional profile that defines a relatively sharp apex along the length of the rib. When such a fastener is intended for use in an environment where a plating will enhance its function (e.g., an anti-corrosive plating), the very small area of intersection of the driver and recess ribs can be expected to result in high stresses sufficient to fracture the plating, particularly when the driver also has ribs on its blades.

It would be desirable to provide improvements in recessed head fasteners and drivers by which the foregoing and other difficulties are reduced or eliminated.

SUMMARY OF THE INVENTION

The present invention is adapted for use in a fastener recess having a central portion and a plurality of wings radiating from the central portion. The wings are defined by a pair of sidewalls and an end wall. Two or more of the sidewalls of the wings includes a relieved region that extends from the upper edge of the sidewall downwardly toward the bottom of the sidewall. The width of the relieved region, measured radially along the sidewall, may decrease progressively from the top to the bottom of the sidewall. The relieved region is configured to leave an elongate strip referred to herein as a "torque pad" extending along the outer margin of the sidewall. The torque pad is adapted to be engaged by the radially outer margin of the driver blade, while the relieved region remains spaced slightly from the driver blade. When the driver is mated with the recess, the outer margins of the driver blades will bear against the torque pads, while the more radially inwardly disposed portions of the blades will remain spaced slightly from the sidewall in the relieved region, unable to transmit force to the relieved region. The torque developed by the driver thus will be applied to the screw head along the torque pads, thereby assuring that the driving force will be applied at the most radially outward regions of the recess sidewalls. By so maximizing the moment arm of the force applied by the driver blades, maximum torque can be transmitted to the screw without applying excessive forces to the recess sidewall. Consequently, the risk of adverse plastic deformation of the recess is reduced.

In another aspect of the invention, the recess can be formed to leave an additional unrelieved rib extending along the inner margin of the drive walls. Such inner rib may serve to engage the innermost regions of the driver blade, near the root of the blade, to provide additional stabilization for the mated driver. By providing both the torque pads at the outer margin of the wing sidewalls and stabilizing ribs at the inner margin the risk of the driver misalignment with the recess is reduced.

Another aspect of the invention relates to the configuration of the heading punch by which the recess may be formed. The punch is provided with raised surfaces on one or both of the drive walls of the punch wings, the raised surfaces being adapted to form the relieved regions in the sidewall of the corresponding recess. None of the surfaces that defines a raised region is oriented in a manner to form undercut surfaces in the resulting recess. All of the surfaces of the raised region are oriented to provide a positive draft angle. Consequently, when the punch forms the recess, it can be withdrawn without damaging or tearing out any of the formed surfaces. The geometry of the raised region can be selected in a manner to define the geometry and dimensions of the resulting torque pad and stabilizing rib of the resultant recess to provide desired recess characteristics. The configuration of the punch is such that it permits the formation of a torque pad in a substantially vertical or non-vertical recess sidewall in which the torque pad is inclined at a substantial angle to the longitudinal axis of the fastener.

In a further aspect of the invention, a mating driver is provided and includes one or more ribs projecting from the sidewalls of the driver. The width of the recess wing is defined between the unrelieved surfaces of the drive walls, may be considered to define a recess envelope receptive to the envelope of a driver bit, the envelopes being dimensioned to mate closely to each other within the limits of practical tolerances. The envelope defined by a driver, including the driver ribs, is selected to correspond to the envelope defined by an unrelieved recess. This enables the driver to be mated properly with the recess, whether the recess is a conventional commercially available recess or is modified in accordance with other aspects of the present invention, summarized above. The elongate driver ribs are oriented to extend generally perpendicular to the outer wing wall of the driver blade so that when mated with a recess formed in accordance with the invention, the driver ribs will extend generally perpendicular to the orientation of their associated torque pad. The ribs can engage and dig into the torque pad sufficiently to enhance the resistance to cam-out while doing so with substantially less deformation than results from engagement of driver ribs with a conventional anti-cam-out rib on the wing wall. In a further aspect of the invention, the ribs of the driver are formed to taper in a radially inward direction, thereby enabling the transverse cross-section of the driver ribs to increase in a radially outward direction but without increasing the dimensions of the driver envelope beyond those of the recess envelope.

It is among the objects of the invention to provide an improved drive system for a recessed head threaded fastener.

Another object of the invention is to provide a recessed head threaded fastener in which the driving force by a mating driver is applied to the radially outer regions of the drive wall(s) of the recess to maximize the moment arm of the driving forces applied to the fastener.

Another object of the inventions is to provide an improved recessed head threaded fastener in which a selected level of torque may be developed while applying a reduced level of stress to the fastener, as compared with the stress that would otherwise be applied in the absence of the invention.

A further object of the invention is to provide an improved ribbed driver adapted for use with a recess made in accordance with the invention yet which also is compatible with conventional recesses.

Another object of the invention is directed to a recessed head fastener having a recess of the type described in which the recess is compatible with conventional drivers as well as the improved driver of the present invention.

A further object of the invention is to provide a driver having ribs located and oriented to effect maximum torque transmission while reducing the damage to the recess.

Another object of the invention is to provide a driver for a recessed head fastener that includes ribs oriented generally perpendicular to the end wall of the blades of the driver.

Another object of the invention is to provide a driver of the type described in which the ribs on the driver blades are adapted to engage a torque pad on a recess formed in accordance with the invention.

Another object of the invention is to provide a recess for a threaded fastener in which the applied force of the driver to the recess is in the radially outermost regions of the wings of the recess and in which a stabilizing rib is provided at the radially inwardly regions of the wings to stabilize the driver with respect to the recess.

Another object of the invention is to provide a header punch for fabricating recessed head fasteners in accordance with the invention.

A further object of the invention is to provide a method for fabricating such recessed head fasteners.

DESCRIPTION OF THE DRAWINGS

The foregoing and other objects and advantages of the invention will be appreciated more fully from the following further description thereof, with reference to the accompanying drawings wherein.

DESCRIPTION OF THE ILLUSTRATIVE EMBODIMENTS

Figure 1:
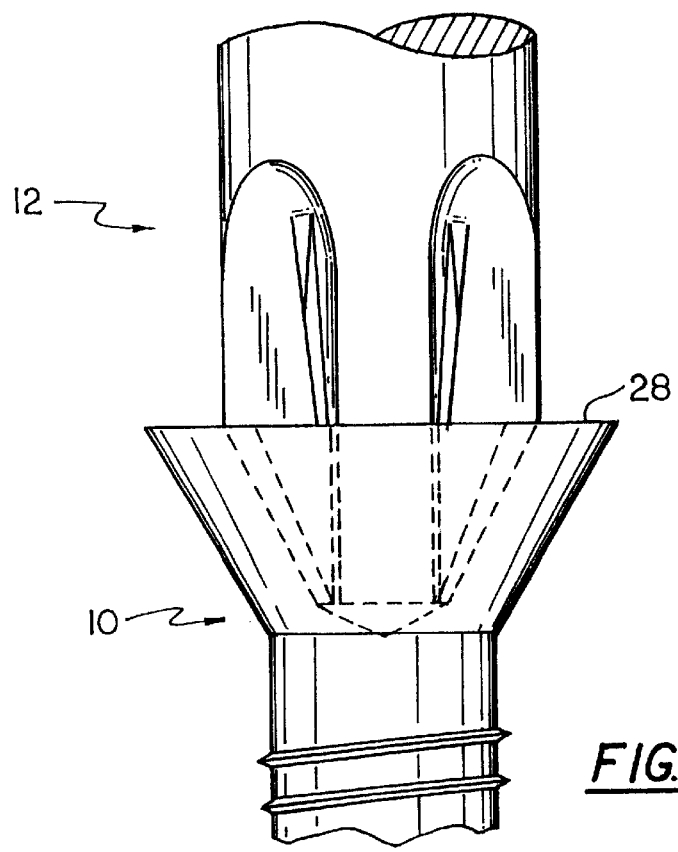
FIG. 1 is an elevation of a mated screw and driver in which the cross recess in the screw head has been modified to incorporate the invention.
Figure 2:
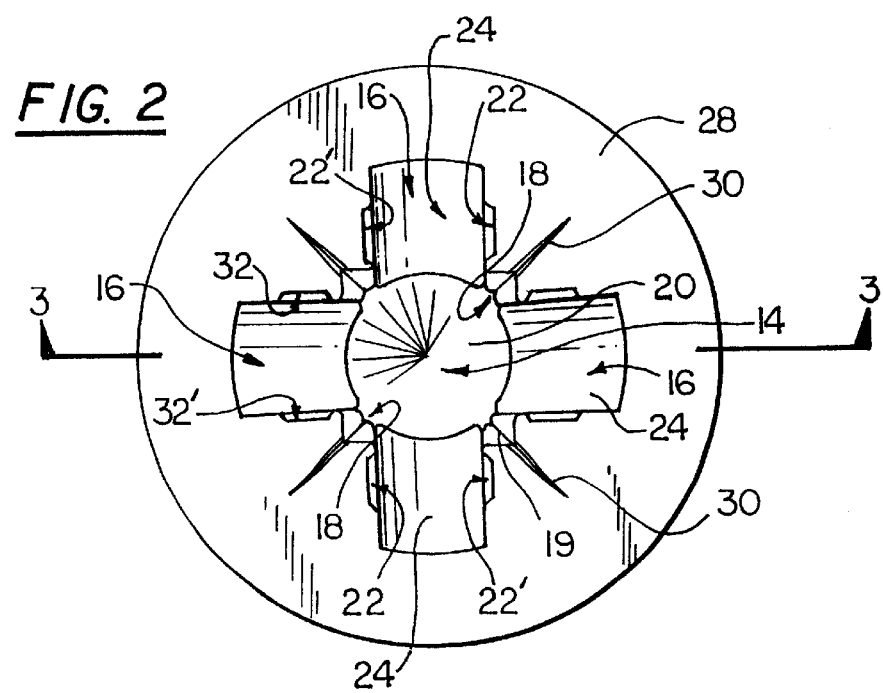
FIG. 2 is a top view of a cross recess screw employing a recess having wings with substantially vertical sidewalls and modified in accordance with the present invention.
Figure 3:
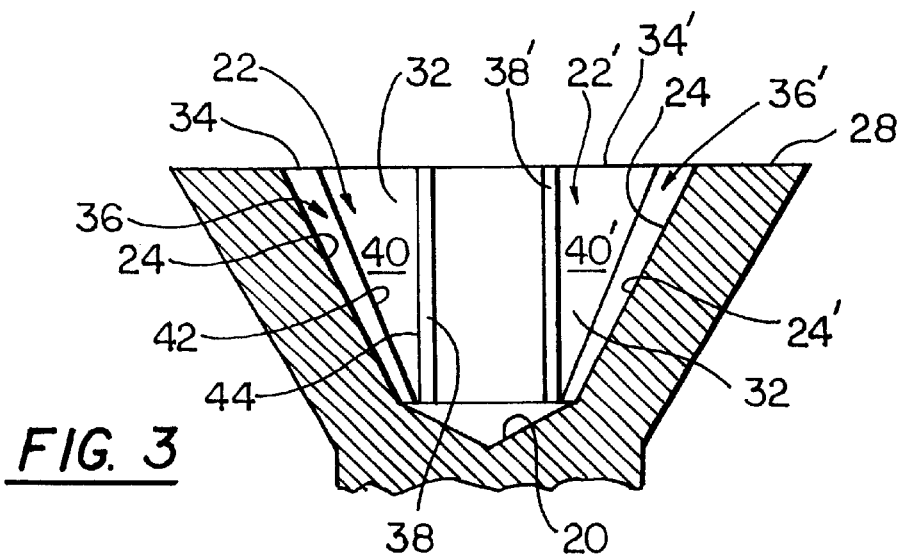
FIG. 3 is a sectional view of a recess in the present invention as seen along the line 3—3 of FIG. 2.
Figure 5:
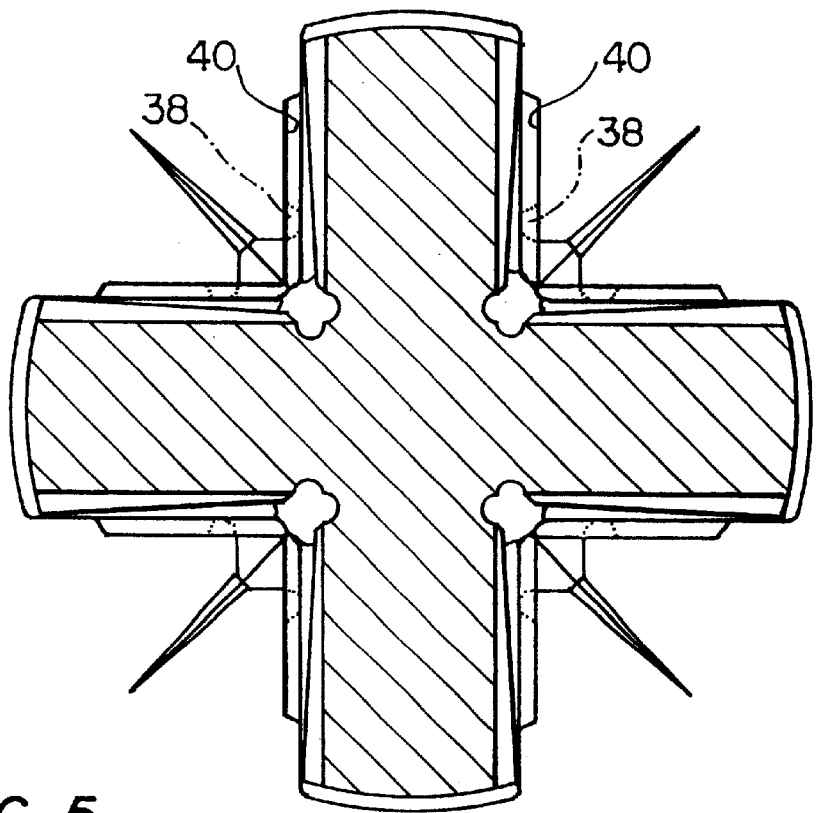
FIG. 5 is an enlarged plan view of a recess and mated ribbed driver of the present invention as seen in section along the line 5—5 in FIG. 1.
Figure 4:
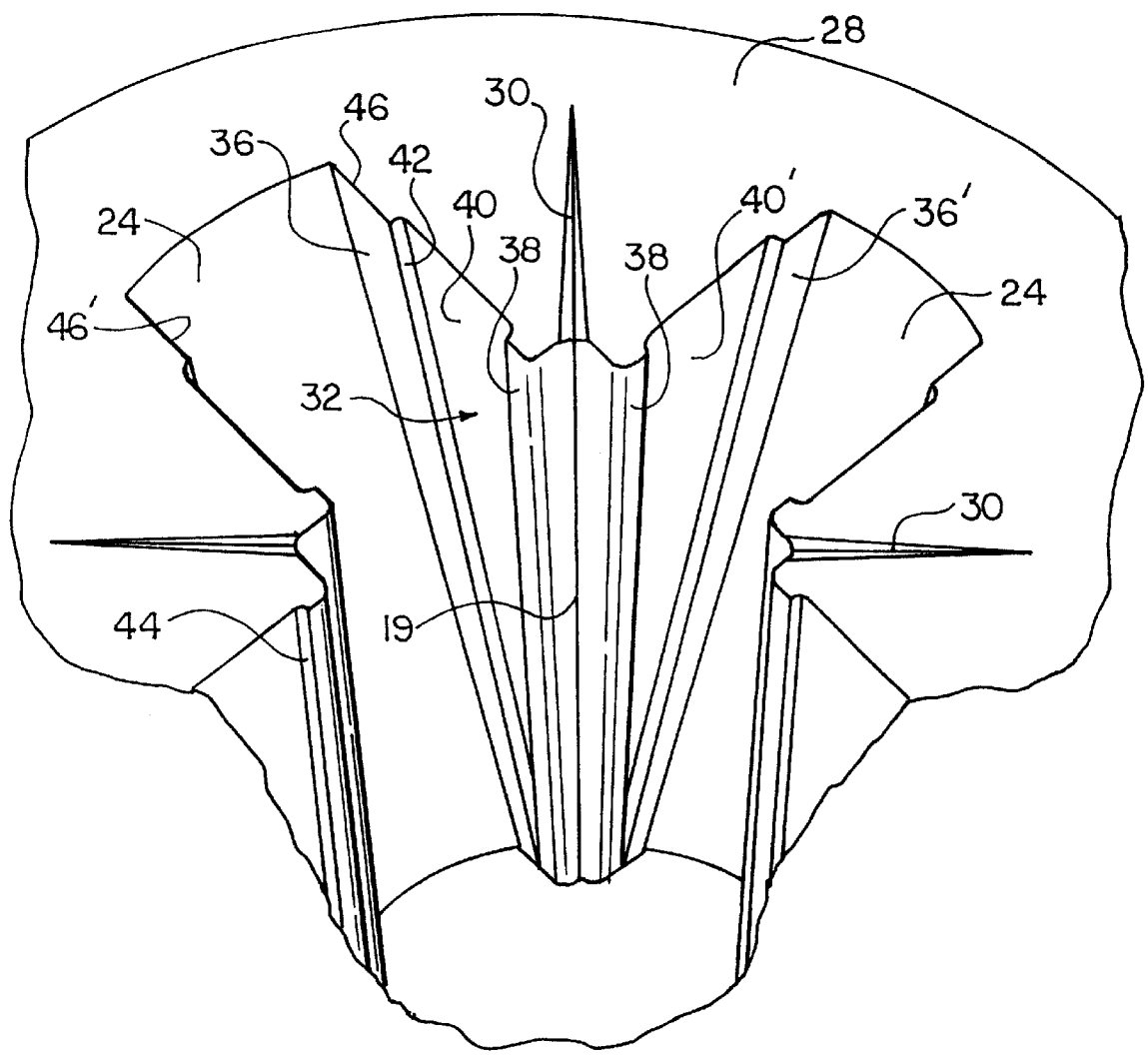
FIG. 4 is a fragmented isometric illustration of a recess embodying the present invention.
Figure 6:
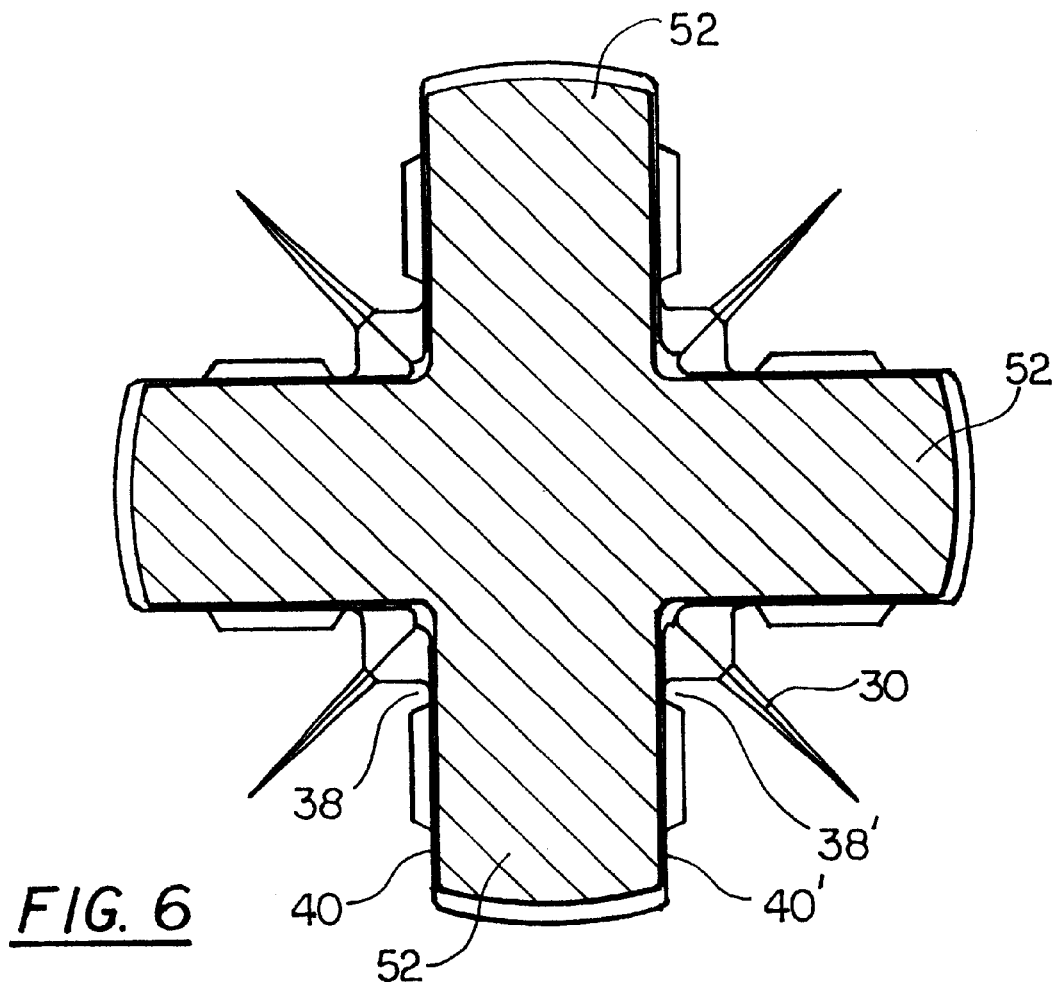
FIG. 6 is an enlarged plan view similar to that of FIG. 5 in which the recess is mated with a conventional unribbed driver.

FIG. 1 shows a combined, recessed head screw 10 and driver 12 with the driver seated fully in the recess in axial alignment with the screw. While the invention is illustrated as incorporated into the recess and driver configuration of the type described in U.S. Pat. No. 3,237,506 (Muenchinger) the principles of the invention may be employed with other types of recessed head screw configurations. FIGS. 2–4 illustrate the invention as incorporated into a Muenchinger recess in a flathead fastener. The driver-engageable recess is of polygonal form that may be defined as generally cruciform in plan. The recess includes a central portion 14 and a plurality of wings 16 that radiate outwardly from the central portion 14. The wings 16 are separated from each other by downwardly and inwardly inclined intermediate walls 18. The bottom regions of the wings 16 and intermediate walls 18 merge into a generally concave recess bottom 20. In the illustrative embodiment, each of the wings 16 is defined by a pair of triangular sidewalls 22, 22' and an end wall 24 that is inclined downwardly and inwardly from the top of the screw head to the bottom wall 20 of the recess. In the following description of the invention, the screw will be considered as right-handed, in which the sidewall 22 serves as the driving wall when the screw is being installed and in which the opposite sidewall 22' serves as the driving wall when the screw is being removed. In the following description, the inclusion of a prime mark with a reference numeral is intended to designate a structure or element associated with removal of the fastener. From the following description, it should be understood, that for convenience, references to components or elements of one drive wall also may apply to an opposite sense drive wall whether or not the reference numerals are associated with a prime mark.

The illustrative recess incorporated in commercially available screws under the designation Pozidriv® screws is characterized by substantially vertical drive walls 22, 22', that is, drive walls that lie in a plane extending substantially parallel to the central axis 26 of the screw. The intermediate walls 18 are formed to define valleys 19 extending downwardly into the recess. The upper surface 28 of the screw head also may be formed with a plurality of radially extending depressions 30 that merge with the upper ends of the valleys 19. The valley-shaped intermediate walls 18 and depressions 30 are formed during the heading of the fastener and aid to displace and direct metal flow to reduce the extent of metal fall-away so that the resulting sidewalls 22, 22' can conform as closely as possible to the vertical. Reference is made to Muenchinger patent 3,237,506 for a further description of that recess, the disclosure of which is incorporated by reference herein in its entirety.

In accordance with the invention, the configuration of one or both of the sidewalls 22, 22' may be provided with a relieved region 32, 32' that extends from the upper edge 34, 34' of the sidewall downwardly toward the bottom of the sidewall 22, 22'. The relieved regions 32, 32' are formed during the heading process, the heading punch being configured to form the relieved regions 32, 32' as described in further detail below. The relieved regions 32, 32' are formed so that the unrelieved portion of their respective sidewall 22, 22', defines a torque pad in the form of a relatively raised elongate strip, indicated generally at 36, 36' that extends along the outer margin of its associated sidewall, that is, where the sidewall meets with the end wall 24 of the wing 16. The torque pad 36, 36' is intended to be engaged by the most radially outward regions of the blades of the mating driver to assure that the driving torque will be applied to the recess drive walls at the most radially outward location of the recess drive walls. The relieved region 32, 32' is designed and configured so that the driver blade will not engage those portions of the sidewall defined by the relieved region 32, 32'. By maintaining engagement of the driver blades with the outermost regions of the sidewalls, the moment arm of the applied torque is maximized, thereby reducing the force necessary to develop the desired level of torque and, consequently reducing the risk of undesirable deformation of the recess.

The relieved region 32. 32' also may be configured to define a heightwise extending stabilizing rib 38 that extends along the inner margin of its associated drive wall. The stabilizing rib 38 may have the same height as the torque pad. The stabilizing rib 38 may serve to guide the driver into the recess to maintain the driver and fastener in axial alignment, thereby promoting controlled and proper seating of the driver in the region. The relieved regions also can serve to collect debris, paint, etc. that otherwise might interfere with full proper seating of the driver in the recess.

The invention can be incorporated into existing, commercially available fasteners, for example only, those available under the trade designations Pozidriv®, Torq-Set®, Tri-Wing®, among others. Such commercially available fasteners are made to conform to standard predefined specifications and tolerances in which the dimensions, angles and contours of the heads and recesses have been standardized. Standard predefined specifications and tolerances for those fasteners available under the trade designation Pozidriv®, Torq-Set® and Tri-Wing® are known to those skilled in the art and are available from Phillips Screw Company of Wakefield, Mass. Such predefined dimensions and specifications are essential if fasteners and drivers made by different manufacturers are to be consistent and compatible with each other. The present invention enables a recess to be modified to obtain the advantages of the invention without affecting the compatibility of the recess with existing drivers while also enabling the further advantages achievable with the recess when used in connection with an improved driver, as described below. More particularly, a conventional recess (i.e., a recess with predefined specification that does not incorporate the invention) may be considered as defining an envelope that conforms to the predefined specifications associated with that recess. The recess envelope is receptive to a generally complementary envelope of the driver intended to mate with the recess. In accordance with this invention, the relieved regions on the sidewalls are formed to be outside of the conventional recess envelope so that no portion of the screw head material that define the modified recess protrudes into that envelope. Consequently, a recess made in accordance with the invention is compatible with conventional drivers adapted for the particular size and type of recess as well as improved drivers of the invention.

The relieved region 32 is defined by surfaces that include a relieved face 40, an outer riser 42 and, if a stabilizing rib 38 is incorporated, an inner riser 44. All of the surfaces 40, 42, 44 are arranged to lie along planes that are substantially vertical or at a positive angle to the vertical so that the recessed region 32 can be formed as part of the recess by the second punch of a two-blow header. The configuration of the recessed region 32 may be varied as desired as long as it does not require the formation of undercuts that cannot be made efficiently with conventional heading techniques and punches. Thus, the shape of the recessed region may be modified by modifying the shape and orientation of each of the relieved surfaces 40, 42, 44. That, in turn, enables modifications to be made to the shape of the torque pad 36 and the stabilizing rib 38. In the illustrative embodiment, the torque pad 36 is illustrated as being wider at its upper edge 46 than at its lower portion, the pad thus defining somewhat of a slender trapezoid. The shape and orientation of the outer riser 42 can be varied to vary the radially measured width of the torque pad 36 along the length of the torque pad. The dimensions and shape of the resulting torque pad 36 may be varied to satisfy the demands of a particular application or to accommodate changes in the material from which the fastener is formed. By way of dimensional example, it is contemplated that for most recess configurations and sizes the depth of the relieved region 32 may be between 0.08 to 0.020 inches in order to assure that the driver will not contact that region of the sidewall and will transmit torque along the torque pad at the radially outward margin of the sidewall. By way of example only, for a fastener having a recess as that shown in FIG. 2, with predetermined specifications and configuration and formed from steel, the torque pad, in the illustrative example, may be of the order of about 0.007 inch wide at its lower end and about 0.019 inch at the top. It should be understood, however, that the configuration of the torque pads and the depth of the relieved regions 32 may be varied as may be desired in order to accommodate different applications or fastener materials. For example, the shape and dimensions associated with the torque pads and relieved regions may be different for a fastener formed from a material softer than steel, such as aluminum or brass. Additionally, it should be noted that although the invention has been described primarily in the context of a fastener formed in a two-blow header, the invention also may be incorporated into polymeric fasteners (e.g., nylon) in which the fastener as well as the head and recess is molded, as by injection molding.

Figure 7A:
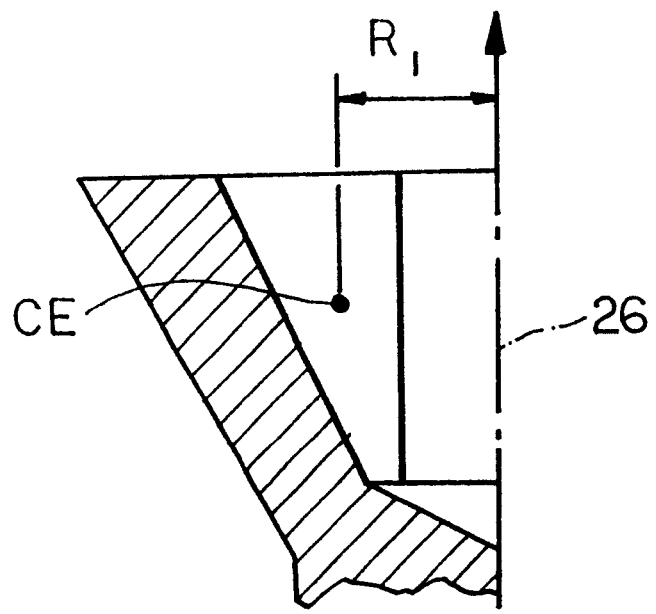
FIG. 7A is a diagrammatic illustration of a wing sidewall of an unribbed conventional recess and the location of the center of effort on the sidewall.
Figure 7B:
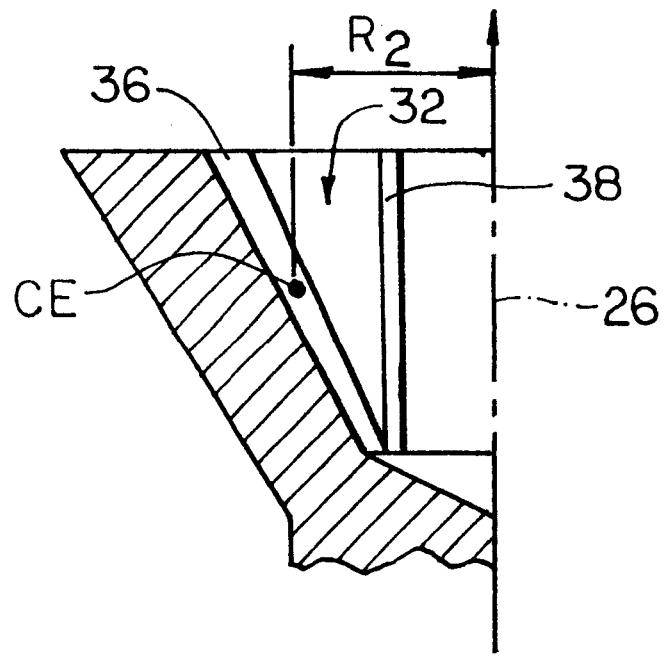
FIG. 7B is a diagrammatic illustration of a wing sidewall embodying the present invention and the location of the center of effort on the torque pad of the sidewall.

FIGS. 7A and 7B illustrate, diagrammatically, the manner in which the present invention results in the transmission of a desired level of torque while applying a force to the wing sidewall that is less than the force that could be expected to be applied in the absence of the invention. FIG. 7A illustrates the sidewall of a conventional recess as compared to FIG. 7B that shows a sidewall of a recess embodying the present invention. When the conventional recess (FIG. 7A) is engaged as intended by its driver, the substantially face-to-face contact of the driver and the recess sidewall, may be considered as transmitting a resultant force at a point, referred to as the center of effort (CE). The center of effort CE may be considered as being located at the geometrical center of the sidewall. In a recess that does not incorporate the invention, the center of effort CE may be considered as being located at a radius $R_1$ from the central axis 26 of the screw. As shown in FIG. 7B with the present invention, the center of effort CE is located on the torque pad 36 at a radius $R_2$ from the central axis that is greater than the radius $R_1$ of the identical recess wing that does not have the relieved region 32. The greater moment arm $R_2$ achieved with the present invention permits application and transmission of identical levels of torque but with less force applied at the center of effort. Consequently, the risk of plastic deformation is reduced.

A further advantage of the invention is that the torque can be transmitted to the torque pads even under high loads that could be expected to cause the driver blades to flex to a somewhat bowed configuration. In a conventional recess, driver blade deformation, even where the driver and recess are properly aligned, results in a shift in the line or region of engagement of the blade with the wing sidewall that, in turn, tends to reduce the radial location and moment arm of the center of effort CE. With the present invention, the depth of the relieved region 32 is such that bowing or other high load deformation of the driver blade cannot significantly, if at all, shift the center of effort radially inwardly because the driver blade remains out of contact with the relieved region of the sidewall.

The stabilizing ribs 38 are provided primarily to guide the driver bit into the recess along a progressively axially aligned attitude so that the driver will seat fully in the recess and will be in axial alignment with the fastener. Consequently, when driving torque is applied, the driver will be in a stable, fully seated position in readiness to applying fully and properly the torque to the torque pads. The stabilizing ribs engage the radially inward regions of the driver blades that cooperate with the driver to prevent insertion of the driver in a significant off-angle attitude. In order to insert the driver, the user must more closely align the driver with the axis of the screw. The stabilizing ribs serve to maintain the stability of the driver-recess connection during driving as well as during mating.

It should be understood that the recess configuration may be varied to provide torque pads on all of the wing sidewalls or on fewer than all of the sidewalls and in various patterns. Thus, torque pads in corresponding relieved regions may be formed on only those sidewalls adapted to transmit torque in the same rotational sets, that is, clockwise or counterclockwise. Other modifications may include formation of torque pads on the same rotative sense sidewalls of opposed wings with the intermediate wings (in a cross-recess) having torque pads formed on the sidewalls having an opposite rotative sense.

Figure 8:
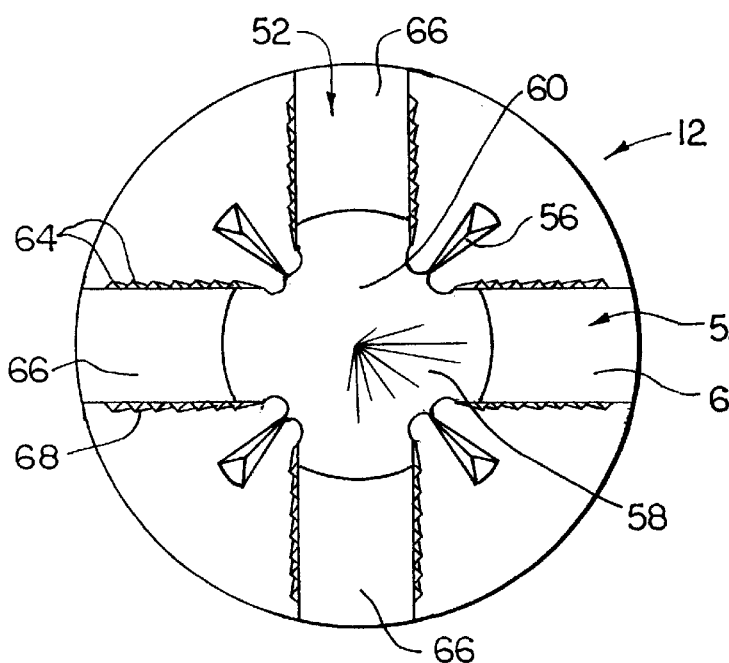
FIG. 8 is an end view of a ribbed driver of the present invention.
Figure 9B:
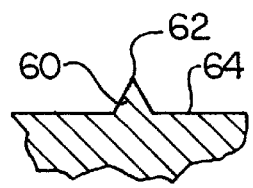
FIG. 9B is an enlarged sectional illustration taken transversely through the outer region of a driver rib as seen along the line 9B—9B of FIG. 9.
Figure 9:
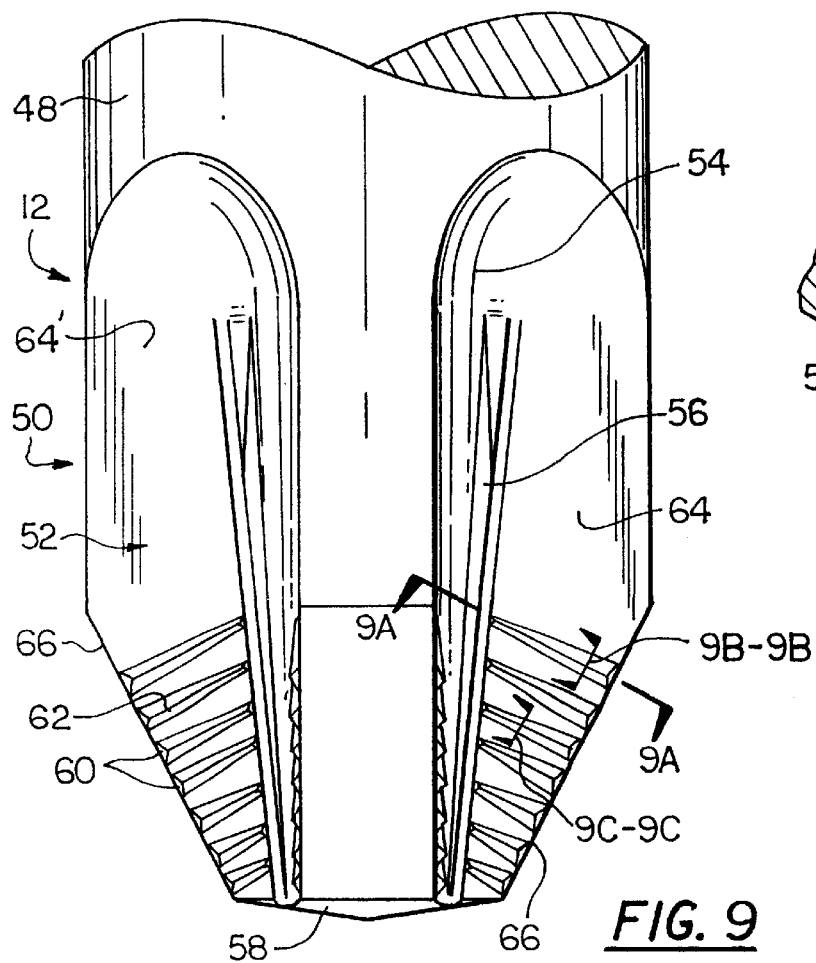
FIG. 9 is a side view of a ribbed driver of the present invention.

In another aspect of the invention, an improved driver is formed to include ribs as shown in FIGS. 8 and 9. The envelope of the ribbed driver is adapted to mate with the envelope of a conventional recess of the same general type although the driver can be used with particular advantage in connection with fastener having recesses made in accordance with the invention. The driver has a shank with the driver nib 50 formed at the end of the shank. The nib 50 includes, in the illustrative embodiment, four blades 52 that radiate from a central core 54. The core 54 and blades 52 are arranged to mate with the recess illustrated in FIG. 2. The region of the core 54 between each pair of adjacent blades 52 may be provided with an elongate ridge 56 that extends downwardly toward the end of the core. The ridges 56 may engage the lower regions of the valleys formed in the intermediate walls 18 of the recess, as described more fully in the aforementioned Muenchinger patent. The tip 58 of the driver may be formed in a conical configuration as shown, or other configuration as desired. Typically, the tip 58 of the driver and the bottom wall 20 of the recess do not conform precisely with each other in order to leave some clearance between the driver tip 58 and the bottom of the recess. Such clearance provides space for debris or excess paint to collect without adversely affecting the ability of the driver to be inserted fully into the recess.

Figure 9A:
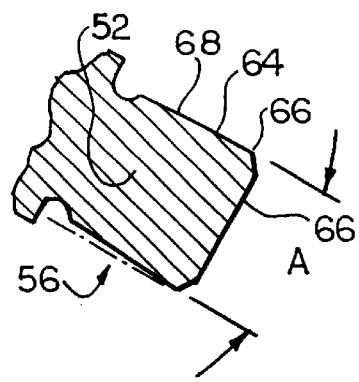
FIG. 9A is a sectional view of the driver wing as seen along the line 9A—9A of FIG. 9.
Figure 9C:
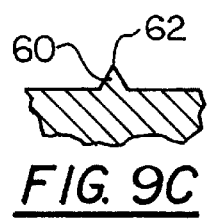
FIG. 9C is a transverse sectional illustration taken through a driver rib at a more radially inwardly location than that of FIG. 9B, and as seen along the line 9C—9C of FIG. 9.

The blades 52 are provided with at least one, and preferably a plurality of ribs 60 raised from the blade face 64. The ribs preferably are triangular in cross section having an elongate ridge 62 adapted to engage and dig into the torque pads 36 of the recess. Each of the ribs 60 has a progressively decreasing cross sectional area and height in a radially inward direction. Consequently, the height of each rib 60, as measured from the surface 64 of the blade decreases progressively in an inwardly radial direction. When viewed in section (FIG. 9A) the ridges 62 of the ribs 60 may be considered as defining the envelope for the blades from which it may be seen that the blade envelope tapers radially inwardly from its maximum width near the end wall 66 of the blade. In the illustrative embodiment it is contemplated that the angle A defined by the ridges 62, which also defines the blade envelope, may be of the order of about 1° to about 5°. By providing the ribs so that their maximum height is at or adjacent to the end wall 66, it is assured that the ribs 60 will engage the torque pads 36 of the recess fully. Additionally, the ribs 60 extend along a direction that is essentially perpendicular to the end wall 66 and, consequently, will engage the surface of the elongate torque pad generally transverse to the lengthwise dimension of the torque pad, enabling a plurality of ribs 60 to engage the torque pad. Unlike the rib engagement described in the aforementioned Simmons patent, in which the sharp ribs in the driver cross and engage similarly slender, sharp ribs on the fastener sidewalls, the present invention enables the ribs to engage the torque pad over a plurality of defined lengths corresponding to the width of the torque pad. With the crossed rib arrangement described in the Simmons patent, the contact between the driver and recess ribs occurs over a very small point-like region. The stresses can be very high with resulting significant deformation of the fastener ribs. With the present invention, although the ribs engage and deform the torque pad surface sufficiently to retard cam-out, the force is spaced over a plurality of contact regions along the torque pad and is distributed so as to be substantially less concentrated. Each of the torque transmission regions extends over a length, corresponding to the width of the torque pads. Consequently, the extent of deformation, although sufficient to prevent cam-out of the driver is not sufficient to significantly damage any part of the recess. Among the advantages of this aspect of the invention is that the damage to plating on the recess may be reduced while maintaining a high level of resistance to cam-out.

The envelope defined by the driver blades is at its widest near the end wall 66 of the driver blades. The driver envelope fits within the envelope of a conventional recess as well as a recess of the present invention. When used with a conventional recess, the wider profile at the outer regions of the blade will promote engagement of the driver blade with the radially outward regions of the sidewalls to provide a maximum moment arm for efficient torque delivery. The height and spaced pattern of the plurality of the ribs serve to prevent the ribs from penetrating excessively into the screw head to cause excessive deformation.

The driver bit may be formed using conventional techniques in which the blades 54 can be formed by a hobbing die. The blades 52 may be formed to have a width slightly smaller than the blades of a conventional counterpart driver. The ribs 60 then are formed on the blade faces by a coining process in which the material in the blades flows to fill the coining die cavity. The coining dies are configured to provide the resulting ribbed configuration, described above.

It should be understood that blade contact with the stabilizing ribs is not a significant factor when driving the fastener. The drivers typically rotate slightly within the recess to take up the small amount of designed-in clearance that is necessary for insertion and withdrawal of the driver. The maximum displacement along the blade for any given amount of torque load on the driver will occur at the point farthest from the center of rotation. Therefore, the blade surfaces near the outer edges rotate into maximum engagement force against the torque pads before any significant engagement force can occur at the stabilizing ribs.

Figure 10:
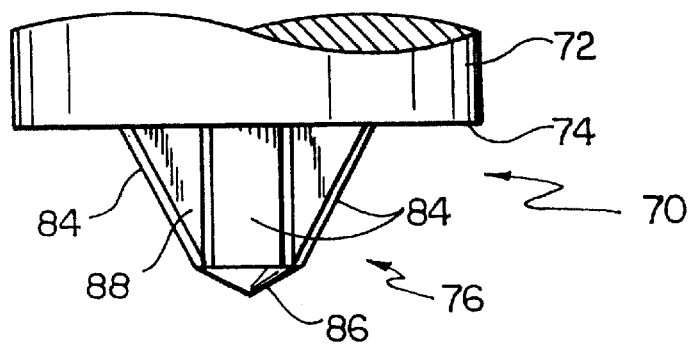
FIG. 10 is a side view of a header punch configured to form the recess of the present invention in a flat head screw.
Figure 11:
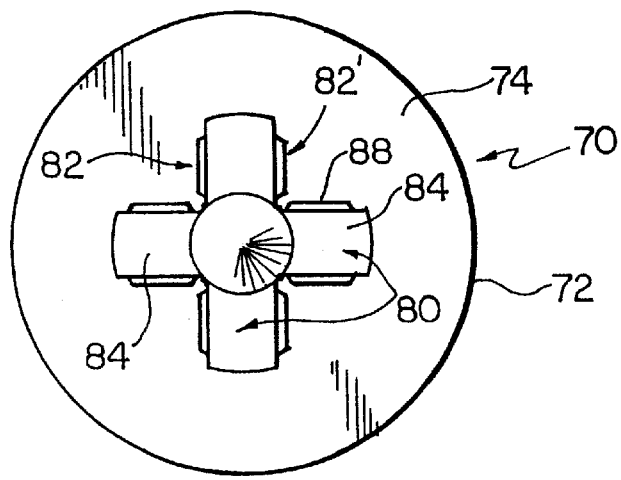
FIG. 11 is an end view of the forming punch of FIG. 10.
Figure 12:
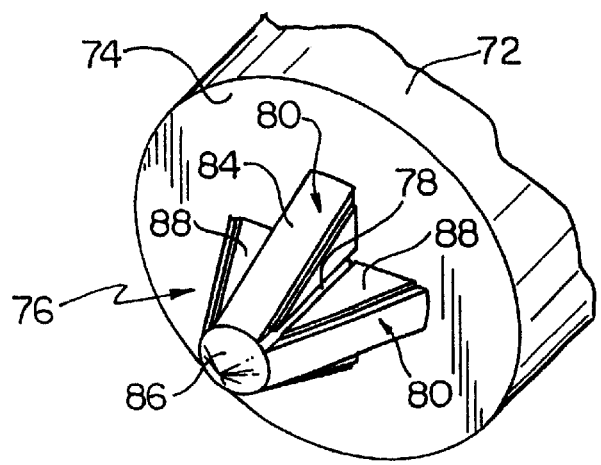
FIG. 12 is a perspective view of the forming punch shown in FIGS. 10 and 11.

The invention also includes the provision of heading punches adapted to form the head of the fastener with the recess. The recess can be formed in conventional heading techniques in a two blow header. FIGS. 10, 11 and 12 illustrate a punch 70 configured to form a simplified cross recess. The punch includes body portion 72 having a face 74 and an integral nib 76 that protrudes from the face. The nib 76 is the complement of the shape of the recess and the face of the punch is of complementary shape to that of the intended screw head, shown here as a flathead. The nib 76 includes a central core 78 and a plurality of blades 80 that extend generally radially and outwardly from the core 78. Each blade 80 has a pair of sidewalls 82, 82' and an end wall 84, the end wall being inclined outwardly from the outer end 86 of the core. The sidewalls of the punch blades are provided with projections 88 that define a cross sectional area and configuration substantially identical to that of the recessed regions 32 to be formed on the sidewall of the recess wing. The projections 88 may be formed on one or both surfaces of each blade, depending on the recess configuration desired. All of the surfaces on the punch have a positive draft angle with no undercutting, thereby enabling the punch to be withdrawn from the form head and recess without damage to the fastener.

From the foregoing it will be appreciated that the invention provides a recessed head fastener drive system by which torque can be applied to the fastener with a reduced level of plastic deformation of the recess but with sufficient engagement of the recess to reduce cam-out and provide a stable transmission of torque. The recesses can be used with existing commercially available drivers and the drivers of the invention can be used with commercially available recesses. When drivers and recesses of the present invention are used together, torque transmission efficiency is improved while also retarding cam-out.

It should be understood that the foregoing description of the invention is intended merely to be illustrative and that other modifications, embodiments and equivalents may be apparent to those skilled in the art.

Having thus described the invention, what we desire to claim and secure by Letters Patent is:

1. A threaded fastener having a driver-engageable recess formed at an end thereof, the recess comprising:
    a central portion;
    a plurality of wings radiating outwardly from the central portion, the wings each being defined by a pair of sidewalls and an end wall adjoining the sidewalls;
    at least one of the sidewalls having a relieved region defined radially inwardly of its associated end wall to define a relatively raised torque pad between the end wall and the central portion of the recess, the torque pad being an elongate strip and extending longitudinally along a margin of the sidewall that adjoins the end wall, the torque pad extending along at least the majority of the length of the end wall.

2. A fastener as defined in claim 1 wherein the at least one sidewall has a top and a bottom, and wherein the torque pad extends downwardly from the top of the sidewall.

3. A fastener as defined in claim 1 wherein the at least one sidewall has a bottom and wherein the torque pad extends downwardly to the bottom of the sidewall.

4. A fastener as defined in claim 1 wherein the at least one sidewall has a bottom and wherein the torque pad extends fully from the top of the sidewall to the bottom of the sidewall.

5. A fastener as defined in claim 1 wherein each of the wings includes at least one torque pad.

6. A fastener as defined in claim 1 wherein one of the sidewalls in each wing has a torque pad.

7. A fastener as defined in claim 1 wherein each sidewall in the recess has a torque pad.

8. A fastener as defined in claim 1 further comprising each of the sidewalls with a relieved region being formed to define a generally vertical stabilizer rib along a radially inward portion of the sidewall, the stabilizer rib defining a radially inner edge of the relieved region.

9. A threaded fastener having a driver-engageable recess at an end thereof, the recess comprising:
    a central portion;
    a plurality of wings radiating outwardly from the central portion, each of the wings being defined by a pair of sidewalls and an end wall;
    a torque pad formed on at least one wall of each of the wings, the torque pad having a driver-engageable surface and being defined by a relieved region that extends radially inwardly from the torque pad substantially to the central portion of the recess, the driver-engageable surface of the torque pad being located and oriented to define a center of effort that is disposed radially outwardly of the center of effort that would be defined by the entire sidewall in the absence of the torque pad.

10. A threaded fastener having a driver-engageable recess formed at an end thereof and a ribbed driver for use therewith comprising:
    the recess having a central portion, a plurality of wings radiating outwardly from the central portion, the wings each being defined by a pair of sidewalls and an end wall, that together define a recess envelope, at least some of the sidewalls of the recess having a relieved region defined radially inwardly of its associated end wall to define a relatively raised torque pad between the end wall and the central portion of the recess, the relieved region being defined outside of said envelope;

the driver comprising a shank portion and a recess-engaging portion formed at the end of the shank portion, the recess-engaging portion comprising a central core and a plurality of blades radiating from the core, each blade having at least one drive wall and an outer wall, at least one rib formed on at least one drive wall of at least one of the blades, the radially outermost end of the at least one rib defining the widest portion of the blade;

the recess envelope being receptive to the driver, the radially outermost end of the at least one rib and the torque pad being engageable with each other to transmit torque from the at least one rib of the driver to one of said torque pads when the driver and recess are mated.

11. A recessed fastener and driver therefor as defined in claim 10 further comprising:

the recess envelope defined by those portions of the recess that do not include the relieved regions corresponding to predetermined defined specifications for the geometry and dimensions of the recess, the recess envelope being receptive to a driver having predefined geometrical and dimensional specifications that correspond to those of the recess envelope as well as to said ribbed driver;

the ribbed driver being receptive in said recess as well as in said relieved recess.

12. A threaded fastener having a longitudinal axis and a driver-engageable recess formed at an end of the fastener, the recess comprising:

a central portion;

a plurality of wings radiating outwardly from the central portion, the wings each being defined by a pair of sidewalls and an end wall adjoining the sidewalls;

at least one of the sidewalls having a relieved region defined radially inwardly of its associated end wall to define a relatively raised torque pad between the end wall and the central portion of the recess, the torque pad being an elongate strip and extending longitudinally along a margin of the sidewall that adjoins the end wall, the torque pad having a riser surface oriented along a direction that is disposed at an acute angle to the longitudinal axis of the fastener.

13. A fastener as defined in claim 12 wherein the at least one sidewall has a top and a bottom, and wherein the torque pad extends downwardly from the top of the sidewall.

14. A fastener as defined in claim 12 wherein the at least one sidewall has a bottom and wherein the torque pad extends downwardly to the bottom of the sidewall.

15. A fastener as defined in claim 12 wherein the at least one sidewall has a bottom and wherein the torque pad extends fully from the top of the sidewall to the bottom of the sidewall.

16. A fastener as defined in claim 12 wherein each of the wings includes at least one torque pad.

17. A fastener as defined in claim 12 wherein one of the sidewalls in each wing has a torque pad.

18. A fastener as defined in claim 12 wherein each sidewall in the recess has a torque pad.

19. A fastener as defined in claim 12 wherein each sidewall in the recess has a torque pad.

20. A fastener as defined in claim 12 further comprising each of the sidewalls with a relieved region being formed to define a generally vertical stabilizer rib along a radially inward portion of the sidewall, the stabilizer rib defining a radially inner edge of the relieved region.

* * * * *